United States Patent [19]

Bernhardt et al.

[11] Patent Number: 5,004,879

[45] Date of Patent: Apr. 2, 1991

[54] SWITCH HOUSING WITH RESILIENT RETAINERS

[75] Inventors: Everett A. Bernhardt, Oregon City; Robert C. Winters, Lake Oswego, both of Oreg.

[73] Assignee: Sentrol, Inc., Portland, Oreg.

[21] Appl. No.: 447,536

[22] Filed: Dec. 7, 1989

[51] Int. Cl.⁵ .............................................. H01H 9/02
[52] U.S. Cl. ................................. 200/295; 200/61.82; 411/510; 335/202; 248/27.3
[58] Field of Search ............... 200/293, 294, 295, 296, 200/61.7, 61.81, 61.82; 248/27.3; 335/151, 153, 154, 202, 205; 411/508, 509, 510, 413; 439/552, 553, 555, 560, 567

[56] References Cited

U.S. PATENT DOCUMENTS

| | | | |
|---|---|---|---|
| 3,024,336 | 3/1962 | Trafton | 200/293 |
| 3,560,690 | 2/1971 | Luce et al. | 200/295 |
| 3,806,852 | 4/1974 | Suska | 200/61.7 |
| 4,005,295 | 1/1977 | Mitchell et al. | 200/61.82 |
| 4,080,522 | 3/1978 | Schimmels | 200/295 |
| 4,148,001 | 4/1979 | Gwozdz | 200/61.7 |
| 4,371,856 | 2/1983 | Holce et al. | 335/202 |
| 4,454,397 | 6/1984 | Kim | 200/295 |
| 4,461,938 | 7/1984 | Sorenson | 200/295 |
| 4,700,163 | 10/1987 | Wolfe | 200/61.7 |
| 4,903,010 | 2/1990 | Greene | 200/61.7 |

Primary Examiner—Henry J. Recla
Assistant Examiner—Glenn T. Barrett
Attorney, Agent, or Firm—Chernoff, Vilhauer, McClung & Stenzel

[57] ABSTRACT

A switch housing in which a cylindrical hollow body of the housing has attached wing elements, each in the form of a partial cylinder and resiliently movable radially and circumferentially of the body, varying the overall transverse dimension of the housing so that the housing may be removably inserted into cavities of various sizes or non-uniform bore, with the wing elements biased to exert outward force against the interior of a cavity. The wing elements may define exterior threads to aid in retention of the housing in a cavity, and a head of the housing preferably defines a chamfered radially extending flange to limit insertion of the housing, and grooves to aid in removing the housing from a cavity.

21 Claims, 2 Drawing Sheets

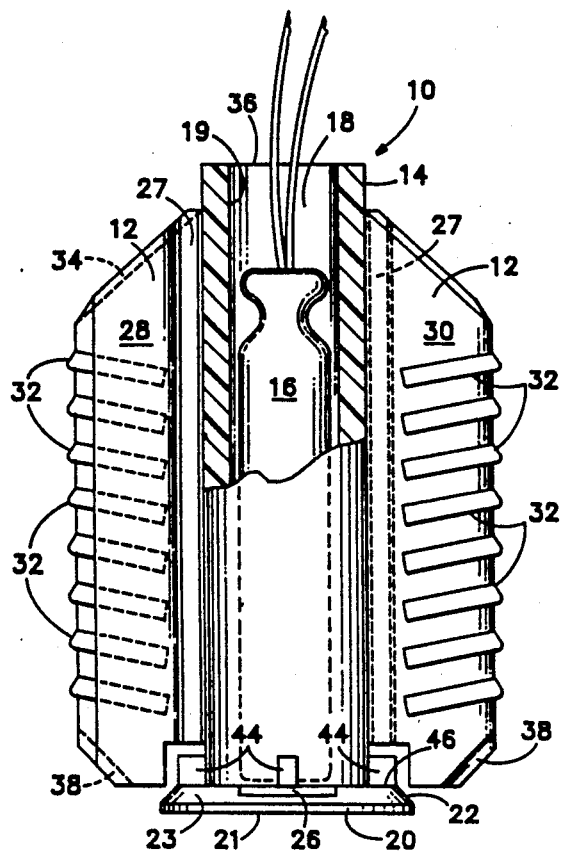
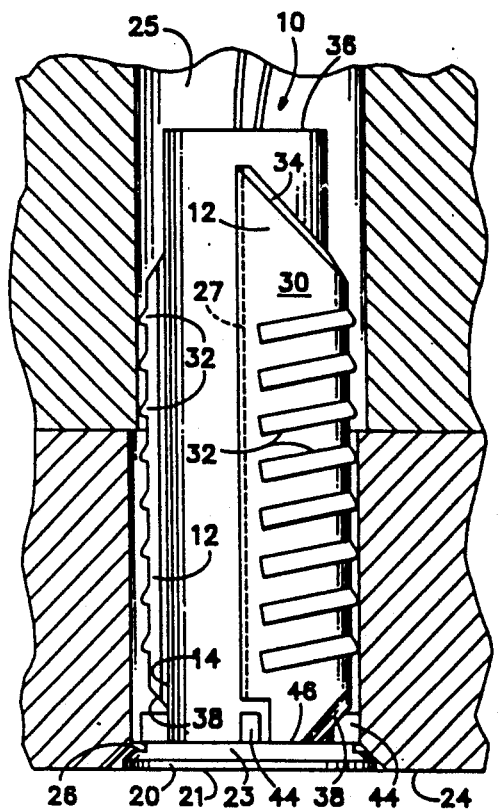
FIG.1
FIG.3
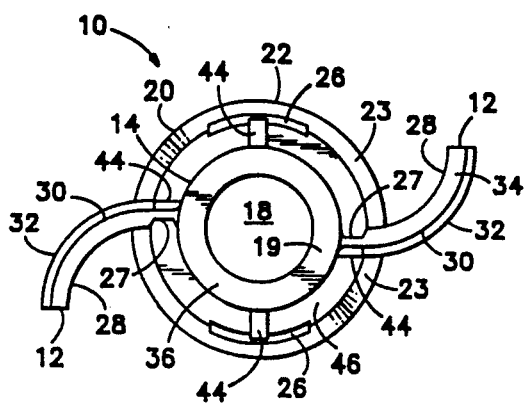
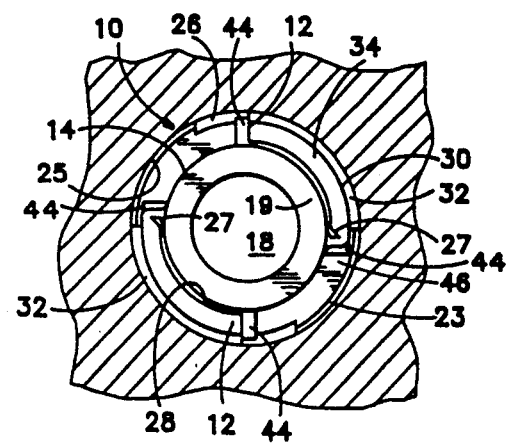
FIG.2
FIG.4

SWITCH HOUSING WITH RESILIENT RETAINERS

BACKGROUND OF THE INVENTION

The present invention relates to switch housings, and particularly to switch housings for use in physical security alarm systems, for mounting sensor switches removably yet securely and unobtrusively in cavities such as holes bored in doorway frames.

When installing magnetic reed switches as parts of an intrusion detection system, it is typical to mount such switches for monitoring door closure in a position flush with a doorway casing by gluing a small cylindrical switch housing in place extending upward into a cavity defined in the horizontal top member of a doorway casing. A corresponding hole is drilled downward into the top of the door and the actuating magnet for the reed switch is mounted therein. Since removal of the switch for testing or replacement is occasionally desirable, gluing a switch housing into a cavity is disadvantageous. Nevertheless the switch housing needs to be held securely in place, or it might be loosened by normal vibration, allowing it eventually to slip down and interfere with the door, resulting in the switch being broken.

Small, protruding, wedge-like, longitudinal fins have been included on the outside of cylindrical switch housings to retain them in position, but are not completely satisfactory for retaining a housing in an overhead cavity without adhesives.

U.S. Pat. No. 3,560,690 to Luce et al. discloses a plunger switch for use in the doorways of automobiles. The switch includes deformable radially outwardly protruding louvers to provide a compression fit of the plunger switch into a bored hole in a doorway frame, but such a switch does not present the neat appearance and unobtrusiveness desired for a security alarm switch housing.

Wolfe, Jr. U.S. Pat. No. 4,700,163 discloses a housing for an alarm system sensor switch. A snap-in cap permits removal of the switch from the housing, but there is no provision for the housing itself to be self-retaining inside a cavity.

Chisholm et al. U.S. Pat. No. 4,728,238 and Wollar U.S. Pat. No. 4,396,329 both disclose fasteners for extending through holes in overlapping members to hold them together. Axially spaced-apart, radially extending flexible members fall generally within planes perpendicular to the length of the fastener and act to press together the members joined by the fasteners.

Hall et al. U.S. Pat. No. 3,177,540 discloses a panel fastener also useful for interconnecting overlapping members which define aligned bores. The Hall fastener includes radial fins which extend longitudinally along the length of the fastener and are flexible about the central axis of the fastener. The fins are tapered to facilitate insertion and thereafter to adjust themselves to proper holding of the members joined by the fastener.

Hauk U.S. Pat. No. 4,638,276 discloses a reed switch housing including exterior threads used to mount a reed switch precisely in machinery.

It has also previously been known to secure security alarm switch housings by screwing a threaded metal housing into a bored hole. Switch housings of this prior art design, however, require holes of relatively exact size and uniform bore, and are undesirably difficult to install. Such housings may be difficult to install where holes are incorrectly drilled or where adjacent layers of material defining a hole have become misaligned.

What is still needed, then, is a housing for use in unobtrusively and securely mounting small items such as security alarm system reed switch assemblies in easily formed cavities, as in finish woodwork or framing around doorways, and which permits easily withdrawal and subsequent reliably secure and easy replacement of the housing in such a cavity without use of an adhesive, despite a poorly shaped cavity or shifting of separate layers of materials after formation of a cavity.

SUMMARY OF THE INVENTION

The present invention overcomes the aforementioned shortcomings and disadvantages of the previously known housings used for mounting small switches and related or similar devices, by providing a housing including a hollow, generally cylindrical body and a pair of curved resiliently movable wing elements, attached to the body by flexible connecting portions, permitting the wings to be wrapped closely about the body or to extend somewhat radially outwardly, depending upon the amount of space available within a cavity, to hold the housing securely within the cavity.

The housing according to the invention is secured in place in a corresponding cavity by means of the wing elements which can be swung with respect to the body along longitudinal hinge lines. In a preferred embodiment of the invention the housing is molded of a material such as PVC plastic, in a form in which the wings resiliently exert outward pressure against the interior of the cavity and are attached to the body of the housing by thin resiliently flexible portions of the same material.

The use of wing elements makes it less important to have a tight fit between the housing and the bore in the doorway frame than with previously available switch housings. The housing of the present invention also fits acceptably into holes which are bored slightly undersized or oversized, holes which are tapered or out of line, or cavities defined by multiple layers of material some of which have slightly shifted positions after formation of the hole.

In a preferred embodiment of the invention each of the wing elements extends outward in a clockwise spiral, as seen from the head end of the housing, and right-hand threads are present, so that turning the housing clockwise tends to make the wings swing outward and force the threads into the material defining the bore surrounding the housing, while also leading the housing into its desired position of installation. Counterclockwise rotation of the housing allows the wing elements to swing in closer to the body of the housing, facilitating its removal when required, as for testing of a switch contained in the housing.

It is therefore a principal object of the present invention to provide an improved housing capable of removably retaining itself in a cavity.

It is another important object of the invention to provide such a housing which can be readily removed and reinstalled in the same cavity.

It is an important feature of the switch housing of the present invention that it includes hingedly mounted wings biased to swing to positions extending radially outward from a body of the housing to engage the interior of a cavity.

Another feature of the switch housings according to the invention is the provision of threads on exterior surfaces of the outwardly biased wings to assist in engaging surrounding interior surfaces of a cavity wherein the housing is to remain.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 1 is a partially cut-away side view showing a switch housing embodying the present invention.

FIG. 2 is an end view of the switch housing shown in FIG. 1.

FIG. 3 is a side view of the switch housing of FIGS. 1 and 2 in place in a bored cavity.

FIG. 4 is a view of the switch housing shown in FIG. 3, taken along line 4—4.

DETAILED DESCRIPTION OF THE INVENTION

Figure 5:
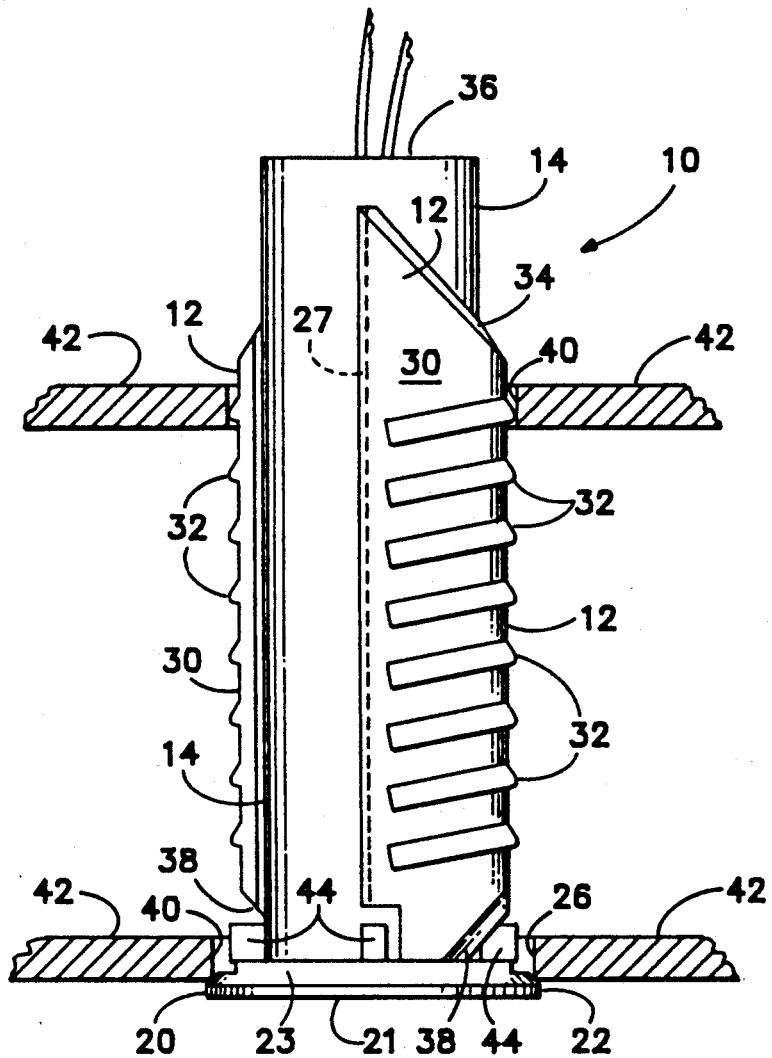
FIG. 5 is a side view showing the switch housing shown in FIG. 1, engaged in a sheet metal trim molding for a doorway, shown in section view.

Referring now to the drawings, in FIG. 1 a switch housing 10 embodying the present invention is of molded plastic material such as PVC. The housing 10 includes two wing members 12 extending outwardly from opposite sides of a hollow cylindrical body 14. An encapsulated reed switch 16 is shown adhesively fastened into a cylindrical cavity 18 defined within the hollow body 14 by a body wall 19. At one end of the housing is a head 20 which has a generally flat end surface 21. The head 20 extends radially outwardly as a chamfered flange 22 protruding beyond the outer surface of the body wall 19. A frusto-conical surface 23 of the flange allows the housing to be countersunk flush with a surface 24 surrounding a countersink included as part of a bored cavity 25 defined in a portion of a building such as a doorway frame. The head 20 also includes a pair of oppositely located notches 26 defined in the chamfered flange 22, so that the switch housing may be easily retracted from a bored cavity such as the cavity 25 by engaging one of the notches 26 with a fingernail or a screwdriver.

The wings 12 are arcuately curved, each having the form of a portion of a thin-walled hollow cylinder. Both of the wings 12 are curved in the same direction with respect to the body 14, and are movable generally about a line of interconnection with the body 14, in hinge-like pivoting fashion. Preferably, this is accomplished by hinge-like bending of connecting portions 27, thinner than the wings 12, which extend axially along the outer surface of the cylindrical body wall 19. As shown in FIG. 2, when the housing 10 is molded, the connecting portions 27 hold the wing members 12 extending radially outward from the body 14. The flexibility of the thinner connecting portions 27 permits the wing members 12 to swing inward, however, to fit closely about the body 14, as shown in FIGS. 3 and 4, with both wings extending in a counterclockwise direction as seen from the open end 36 of the body 14 in FIG. 4. An inner surface 28 of each wing member 12 is thus located closely alongside the cylinder wall 19 while an outer surface 30 is exposed outwardly away from the body 14.

Disposed in positions spaced apart axially of the housing on the outer surface 30 of each wing member 12 are helically-extending outwardly projecting threads 32 with a right-hand pitch, which serve to hold the switch housing in the cavity, as by engaging themselves against the interior surfaces of a cavity such as the cavity 25 in which the housing 10 is located.

Each of the wing elements 12 has a leading end surface 34 which extends slopingly back from the front or open end 36 of the housing 10. The leading end surface 34 also extends slopingly between the inner surface 28 and outer surface 30 of the wing member 12 so as to form an acute angle with the inner surface 28 and an obtuse angle with the outer surface 30. The leading end surface 34 thus presents a tapered, or swept-back, configuration which helps to lead the housing 10 into a bored hole such as the cavity 25, so that the housing 10 can be inserted in such a cavity merely by pushing it after initially squeezing the wing members 12 inward toward the body 14 far enough to start the leading end surfaces 34 into the cavity.

By flexing the thin connecting portions 27, the wing members 12 can be moved toward the body wall 19 to wrap around the body 14 closely, as shown in FIGS. 3 and 4. When the housing 10 of the invention is located in a cavity 25 of the most appropriate diameter, the wing members 12 are located closely adjacent to the hollow body 14, although it will also be retained in an oversize cavity by the outward movement of the wings 12 to engage the interior wall surfaces of a cavity of any size within a range limited by the range of movement of the wings 12. The resilient nature of the plastic material of which it is made creates a radially outward biasing force, urging the wings 12 outwardly into contact with the interior surfaces of the cavity 25 and tending to engage the projecting threads 32 with the interior of the cavity 25.

In addition, if the housing 10 is twisted in a clockwise direction, the right-handed pitch of the threads 32 cooperates with the clockwise direction in which the wing members 12 wrap around the body 14, as seen from the head end of the housing 10. Twisting the housing 10 clockwise tends to force the wing members 12 to swing outwardly as the outer surfaces of the wing members rub on the interior surfaces of the cavity 25. This assists in urging the threads 32 into engagement with the surrounding surfaces of the interior of the cavity 25. Thereafter, the resiliency of the wings and the connecting portions 27 continue to urge the threads 32 into engagement with the surfaces of the cavity 25.

At the trailing end of each of the wings 12, the end closer to the head 20 of the housing, a trailing end surface 38 extends slantingly from the body 14 toward the outer margin of the wing 12. As with the leading end surface 34, the trailing end surface 38 meets the inner surface 28 in an acute angle, while intersecting the outer surface 30 in an obtuse angle. The trailing end surface 38 thus acts as a wedge to retain the housing 10 in place extending through a hole 40 defined in a sheet metal door casing trim structure 42, as the wings 12 are resiliently biased outwardly.

Four small spacer blocks 44, which may be generally rectangular, extend radially outwardly from the body 14 adjacent the front surface 46 of the flange 22. In a preferred embodiment of the invention, there are four spacer blocks 44 spaced at 90 intervals about the circumference of the body 14 and head 20. The blocks 44 serve to center the head end of the housing 10 within the opening of a cavity 25 or a hole 40 defined in a sheet metal doorway frame trim. The wings 12 are accordingly located so as not to overlap the blocks 44.

The notches 26 defined in the chamfered flange 22 can be engaged in order to start outward movement of the housing 10 when it is necessary to remove the housing. Once the housing 10 has been withdrawn a short distance, sufficient to permit the head 20 to be grasped easily, the housing 10 can be rotated counterclockwise, as seen from the head end, and removal from within the cavity is aided by the pitch of the threads 32, by the wedging action of the trailing end surfaces 38 and by the ability of the wing members 12, because they wrap spirally about the body 14, to bend in closer toward the body 14, thus disengaging the threads 32 from the interior surfaces of the cavity 25.

As may be seen in FIG. 3, the flexibility of the connecting portions 26 permits the wing members 12 to move relative to the body 14 to engage the interior surfaces of the cavity 25. This remains true despite possible misalignment between different portions of the interior cavity 25 resulting, for example, from relative motion of different layers of the structure in which the cavity 25 is defined. Thus, despite the cavity 25 being out-of-round, or portions of the interior of the cavity not being coextensive of other portions of the interior surfaces of the cavity 25, at least portions of the threads 32 or the outer surfaces 30 or the trailing end surfaces 38 of the wing 12 will engage themselves with the interior surfaces of a cavity 25 or hole 40. The outward biasing force of the connecting portions 26 urges each wing 12 outwardly away from the body 14 with sufficient force to hold the housing 10 properly in place. The housing is thus capable of maintaining its position such an upwardly extending position within a downwardly open cavity 25 defined in the overhead portion of a doorway frame member, and even after removal from and reinstallation into the cavity 25.

The terms and expressions which have been employed in the foregoing abstract and specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A switch housing for insertion into a cavity comprising:
   (a) hollow body means for holding a switch, said hollow body means having a cylindrical surface and being free from openings in said cylindrical surface;
   (b) a wing of resilient material extending from said cylindrical surface of said hollow body means and formed integrally therewith, said wing being resiliently movable with respect thereto between a position in which said wing extends away from said hollow body means and a position in which said wing is located alongside said body means; and
   (c) means for biasing said wing to exert pressure outwardly away from said body means against an interior surface of said cavity for retaining said housing in said cavity.

2. The switch housing of claim 1, said wing having an outer surface and retention means protruding outward from said outer surface for engaging said interior surface of said cavity to retain said switch housing in said cavity.

3. The switch housing of claim 1 wherein said hollow body means is generally cylindrical.

4. The switch housing of claim 1 wherein said hollow body means has a pair of opposite ends and said switch housing includes a head closing one end of said hollow body means.

5. The switch housing of claim 4 wherein said head includes chamfered flange means extending radially outward beyond said hollow body means for limiting insertion of said housing into said cavity.

6. The switch housing of claim 5 wherein said head includes a flange extending radially outward beyond said body means and notch means defined in said flange for receiving a tool to pry said housing outwardly from said cavity.

7. The switch housing of claim 1 wherein said wing is arcuately curved, having the form generally of a portion of a cylinder.

8. The switch housing of claim 1 including a plurality of said wings.

9. The switch housing of claim 8 wherein each of said plurality of wing elements is movable with respect to said hollow body means along a respective hinge line extending longitudinally along said hollow body means.

10. The switch housing of claim 9 wherein each said hinge line is defined by a connecting portion which is thinner than the adjoining portion of said wing.

11. The switch housing of claim 8 wherein each of said wings is arcuately curved, each having the form generally of a portion of a cylinder.

12. The switch housing of claim 8 each said wing having an outer surface and retention means, including outwardly projecting helical threads located on said outer surface for cooperating with the movement of said wing elements to retain said housing within a cavity having a size within a predetermined range of sizes.

13. The switch housing of claim 1 wherein said hollow body has a pair of opposite ends and including a head closing one of said ends and spacer means extending outwardly from said hollow body means at a location proximate to said head, for locating said housing centrally within a cavity.

14. A switch housing for insertion into a cavity, comprising:
   (a) hollow body means for holding a switch;
   (b) a wing attached to said body means and resiliently movable with respect thereto between a position in which said wing extends away from said body means and a position in which said wing is located alongside said body means;
   (c) means for biasing said wing to exert pressure outwardly away from said body means against an interior surface of said cavity for retaining said housing in said cavity;
   (d) said wing having an outer surface and retention means, consisting of outwardly projecting helical threads which extend along said wing, for engaging said interior surface of said cavity to retain said switch housing in said cavity.

15. The switch housing of claim 14 further comprising a plurality of said wings.

16. The switch housing of claim 15 wherein each of said plurality of wing elements is movable with respect to said hollow body means along a respective hinge line extending longitudinally along said hollow body means.

17. The switch housing of claim 16 wherein each said hinge line is defines by a connecting portion which is thinner then an adjoining portion of said wing.

18. A switch housing for insertion into a cavity, comprising:

(a) elongate hollow body means for holding a switch;
(b) a wing attached to said body means and resiliently movable with respect thereto about a hinge portion extending longitudinally therealong, between a position in which said wing extends away from said body means and a position in which said wing is located alongside said body means;
(c) means for biasing said wing to exert pressure outwardly away from said body means against an interior surface of said cavity for retaining said housing in said cavity.

19. The switch housing of claim 18 of molded plastic material wherein said hinge portion comprises a flexible portion of said housing which is thinner than said wing element and located between said hollow body means and said wing.

20. The switch housing of claim 18 further comprising a plurality of said wings.

21. The switch housing of claim 18 wherein said wing has an outer surface and retention means, including outwardly projecting helical threads located on said outer surface, for cooperating with the movement of said wing to retain said housing within a cavity having a size within a predetermined range of sizes.

* * * * *

UNITED STATES PATENT AND TRADEMARK OFFICE
CERTIFICATE OF CORRECTION

PATENT NO. : 5,004,879

DATED : April 2, 1991

INVENTOR(S) : Robert C. Winters et al.

It is certified that error appears in the above-identified patent and that said Letters Patent is hereby corrected as shown below:

Col. 4, line 63    Change "90" to --90°--.

Col. 6, line 65    Change "defines" to --defined--.

Signed and Sealed this

Twenty-second Day of September, 1992

Attest:

DOUGLAS B. COMER

Attesting Officer    Acting Commissioner of Patents and Trademarks